(12) United States Patent
Taketomi et al.

(10) Patent No.: US 6,288,508 B1
(45) Date of Patent: Sep. 11, 2001

(54) ELECTRIC MOTOR FOR A VEHICLE HAVING REGENERATIVE BRAKING AND REVERSE EXCITATION BRAKING

(75) Inventors: Kouichi Taketomi; Akira Inui, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/458,881

(22) Filed: Dec. 10, 1999

Related U.S. Application Data (63) Continuation of application No. 08/964,500, filed on Nov. 5, 1997.

(51) Int. Cl.[7] .................................................. H02P 3/14
(52) U.S. Cl. ................................................ 318/376; 318/139
(58) Field of Search ................................ 318/370, 375, 318/376, 139

(56) References Cited

U.S. PATENT DOCUMENTS

| | | |
|---|---|---|
| 3,569,811 | 3/1971 | Miller et al. . |
| 3,657,625 * | 4/1972 | Miller et al. ............................ 318/370 |
| 3,670,225 | 6/1972 | Kitaoka et al. . |
| 3,755,724 | 8/1973 | Anderson . |
| 4,093,900 * | 6/1978 | Plunkett ................................. 318/370 |
| 4,096,423 | 6/1978 | Bailey et al. . |
| 4,112,475 | 9/1978 | Stitt et al. . |
| 4,124,812 | 11/1978 | Naito et al. . |
| 4,322,667 | 3/1982 | Ohba . |
| 4,380,724 | 4/1983 | Franz, Jr. et al. . |
| 4,423,363 | 12/1983 | Clark et al. . |
| 4,427,928 * | 1/1984 | Kuriyama et al. ..................... 318/139 |
| 4,479,080 | 10/1984 | Lambert . |
| 4,730,151 | 3/1988 | Florey et al. . |
| 4,761,600 * | 8/1988 | D'Atre et al. .......................... 318/800 |
| 5,350,985 * | 9/1994 | Konrad et al. ......................... 318/370 |
| 5,598,072 * | 1/1997 | Lambert ................................. 318/376 |
| 5,637,967 | 6/1997 | Kim . |
| 5,793,175 * | 8/1998 | Journey ................................. 318/493 |

* cited by examiner

Primary Examiner—Jonathan Salata
(74) Attorney, Agent, or Firm—Ernest A. Beutler (57) ABSTRACT

A braking system for an electric motor operated vehicle including a system for providing both regenerative and reverse excitation braking and shifting between the braking modes in response to operator demand.

4 Claims, 7 Drawing Sheets

ELECTRIC MOTOR FOR A VEHICLE HAVING REGENERATIVE BRAKING AND REVERSE EXCITATION BRAKING

CROSS REFERENCE TO RELATED APPLICATION

This application is a continuation of our application of the same title, filed Nov. 5, 1997 under Ser. No. 08/964,500.

BACKGROUND OF THE INVENTION

This invention relates to an electric motor control and more particularly to an electric motor control for an electric motor powered vehicle for providing improved braking operation therefor.

A wide variety of types of vehicles are frequently employ electric motors for their propulsion. These types of vehicles may take many forms such as golf carts and the like. In connection with these vehicles, it is common to utilize a frictional brake system for the vehicle which is of the type used with wheeled vehicles that are powered by gasoline engines or other forms of internal combustion engines. These frictional brakes may be either hydraulically or electrically actuated. This obviously adds to the cost of the total vehicle.

There have been proposed systems which regenerative braking is employed for the vehicle. With this type of arrangement, when the operator wishes to decelerate the vehicle, the motor is switched to operate as a generator and either charges the battery or discharges its generated current through a resistive load so as to provide regenerative braking. However, with these systems, conventional frictional brakes also are employed.

It is, therefore, a principle object of this invention to provide an improved braking arrangement for an electrically powered vehicle wherein the electric motor can provide substantially all of the braking force for the vehicle.

It is a further object of this invention to provide an improved braking system for an electric powered vehicle wherein the electric motor is utilized as a brake in addition to the regenerative braking normally employed in connection with such vehicles.

SUMMARY OF THE INVENTION

This invention is adapted to be embodied in a vehicle having an electric motor for propelling the vehicle. The electric motor is of the shunt type and is supplied with electric current from a battery in response to an accelerator control for controlling the speed of the vehicle. A regenerative braking arrangement is employed for generating electric power by using the shunt motor as a generator and returning the power to the power source for braking. In addition, a reverse exciting winding control circuit is provided for applying reverse excitation to the winding of the shunt motor for effecting reverse excitation braking. Means are provided for switching the braking control from the regenerative braking to the reverse exciting winding braking based upon the operator input.

DETAILED DESCRIPTION OF THE PREFERRED EMBODIMENTS

Figure 1:
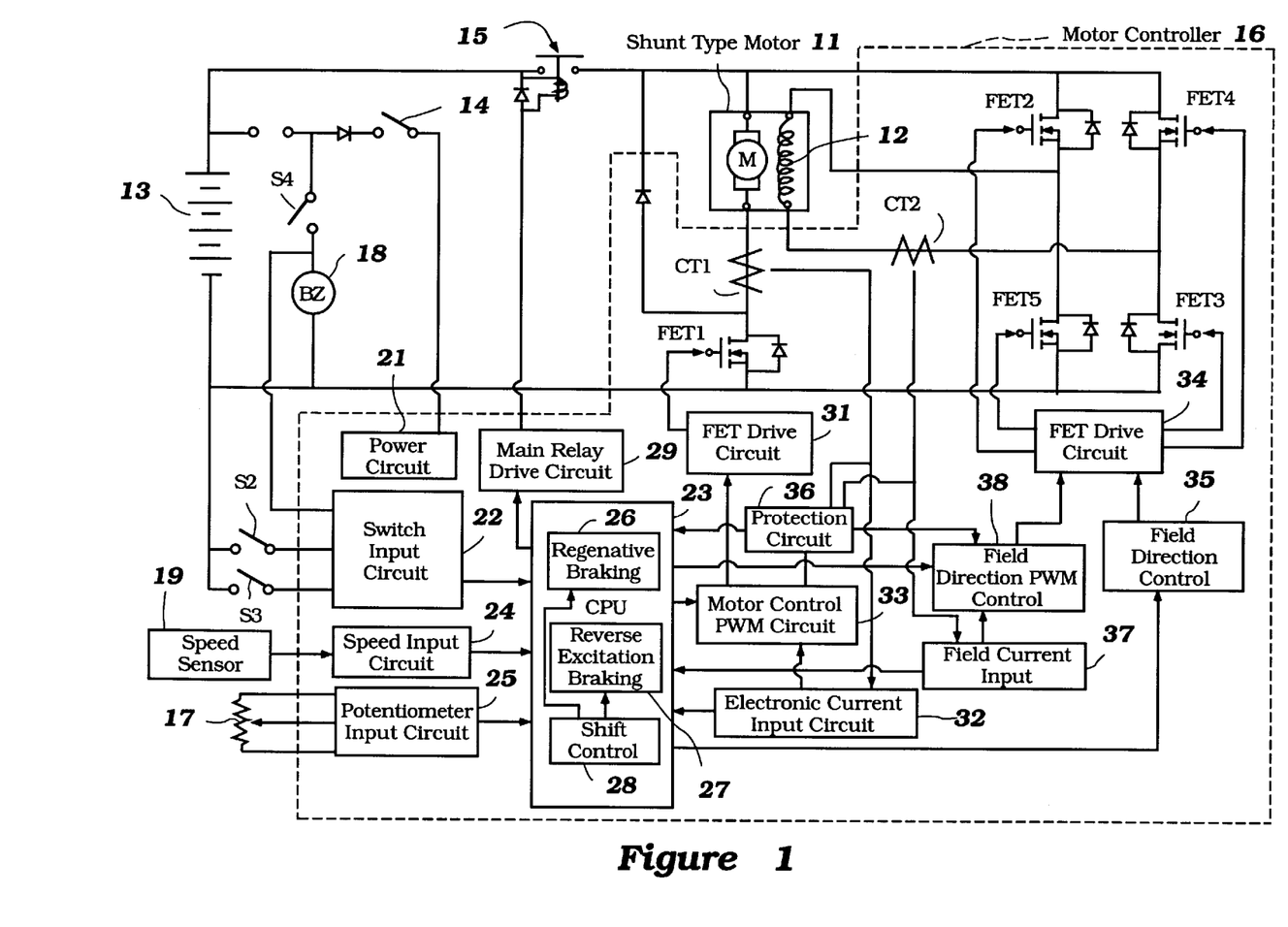
FIG. 1 is a partially schematic control circuit for an electric motor powered vehicle and shows certain of the components in electrical diagrams and other components only in block form.

Referring now in detail to the drawings and initially to FIG. 1, the control and drive system for an electric motor propulsion system for a vehicle is depicted. The system includes a shunt-type electric motor, indicated generally by the reference numeral 11 having an exciter winding 12.

This shunt motor 11 is energized by an electric battery source 13 through a control system which includes a main switch 14 that operates a main relay switch 15 for energizing the motor 11 in a manner which will be described for powering the associated vehicle. The vehicle per se is not illustrated, but it should be understood that the invention can be used with any of a wide variety of types of vehicles that are powered by electric motors. A golf cart is just a typical example of such a vehicle.

Although the vehicle is not shown, it includes an accelerator switch S2 which is operated by the operator accelerator pedal or other speed control so as to provide a speed control signal to the electric motor and specifically to its control circuit, indicated generally by the reference numeral 16. A potentiometer type of sensor 17 is also associated with the accelerator pedal so as to provide a signal indicative of the operator demand for speed.

The system is also provided with a braking arrangement that is actuated by a switch S3 which operates to provide either selective regenerative or reverse excitation braking of the motor 11 in manners which will be described.

The operator can also select reverse operation by a reverse switch S4 which reverses the direction of rotation of the motor 11 so as to drive the vehicle in a rearward direction. When reverse operation is selected, a buzzer, indicated generally by the reference numeral 18, is activated so as to provide a warning signal.

For the vehicle control, there is also provided a vehicle speed sensor 19 which may be of any known type and which can cooperate, for example, with a driven wheel or a portion of the driving transmission to provide a speed signal to the motor control 16.

Referring now in more detail to the motor control, this includes a power control circuit 21 that powers the motor controller 16 and which is energized when the main switch 14 is closed. There is also provided a switch input circuit 22 that senses the conditions of the switches S2, S3, and S4 so as to provide the motor controls, as will be described.

The switch input circuit 22 inputs a signal to a CPU 23 which includes several sections, as will be described. This CPU 23 controls the operation of the motor 11 and the excitation of the winding 12 in the manner which will also be described.

The speed sensor 19 inputs its signal to a speed input circuit 23 which in turn provides a signal to the CPU 24 which provides indication of the speed of travel of the vehicle to the CPU 23 for control of the various system. In addition, the potentiometer 17 outputs data to a potentiometer input circuit 25, which, in turn, inputs its input data to the CPU 23.

The CPU 23 includes three sections associated with the braking. These are comprised of a regenerative braking circuit 26, a reverse excitation braking circuit 27 and a shift control circuit 28 which shifts between the regenerative braking provided by the control circuit 26 and the reverse excitation braking provided by the circuit 27.

The CPU 23 also includes controls a main relay drive circuit 29 which energizes the main relay 15 when the system is operational.

The armature windings of the electric motor 11 are connected to the poles of the battery through the main relay 15 and through a first field effect transistor (FET 1). The FET 1 is switched by a FET drive circuit, indicated schematically at 31. This controls the speed or power applied to the shunt type motor 11 from an electric current input circuit, indicated at 32. This circuit communicates with a motor control pulse width modulation circuit (PWM) 33 which functions so as to provide switching of the FET drive circuit under the control of the CPU 23 so as to provide the amount of speed required as demanded by the operator due to the position of the accelerator switch S2 and the associated potentiometer 17.

The armature current is sensed by a current sensor CT1 in the circuit between FET 1 and the motor 11.

The exciter winding 12 of the shunt motor 11 is controlled by an FET drive circuit, indicated generally by the reference numeral 34 and which operates so as to determine the polarity of the winding 12 by switching FETs, FET 2, FET 3, FET 4 and FET 5 in an obvious manner.

The FET drive circuit 34 is controlled by a field direction control circuit 35 which receives input signals from the CPU 23 indicative of whether the shunt motor 11 is in a forward drive mode or is shifted into a reverse drive mode by switching the reverse drive switch S4 or to provide regenerative braking in the manner which will be described shortly.

The exciter winding current is sensed by a sensor CT2 which outputs its signal to both a protection circuit 36 and magnetic field current input circuit 37 each of which input data to the CPU 23. The amount of excitation is controlled by a magnetic field direction pulse width modulating circuit 38 which is also driven by the CPU 23 to control the amount of current flow through the exciter winding 12 to achieve the desired performance.

Figure 2:
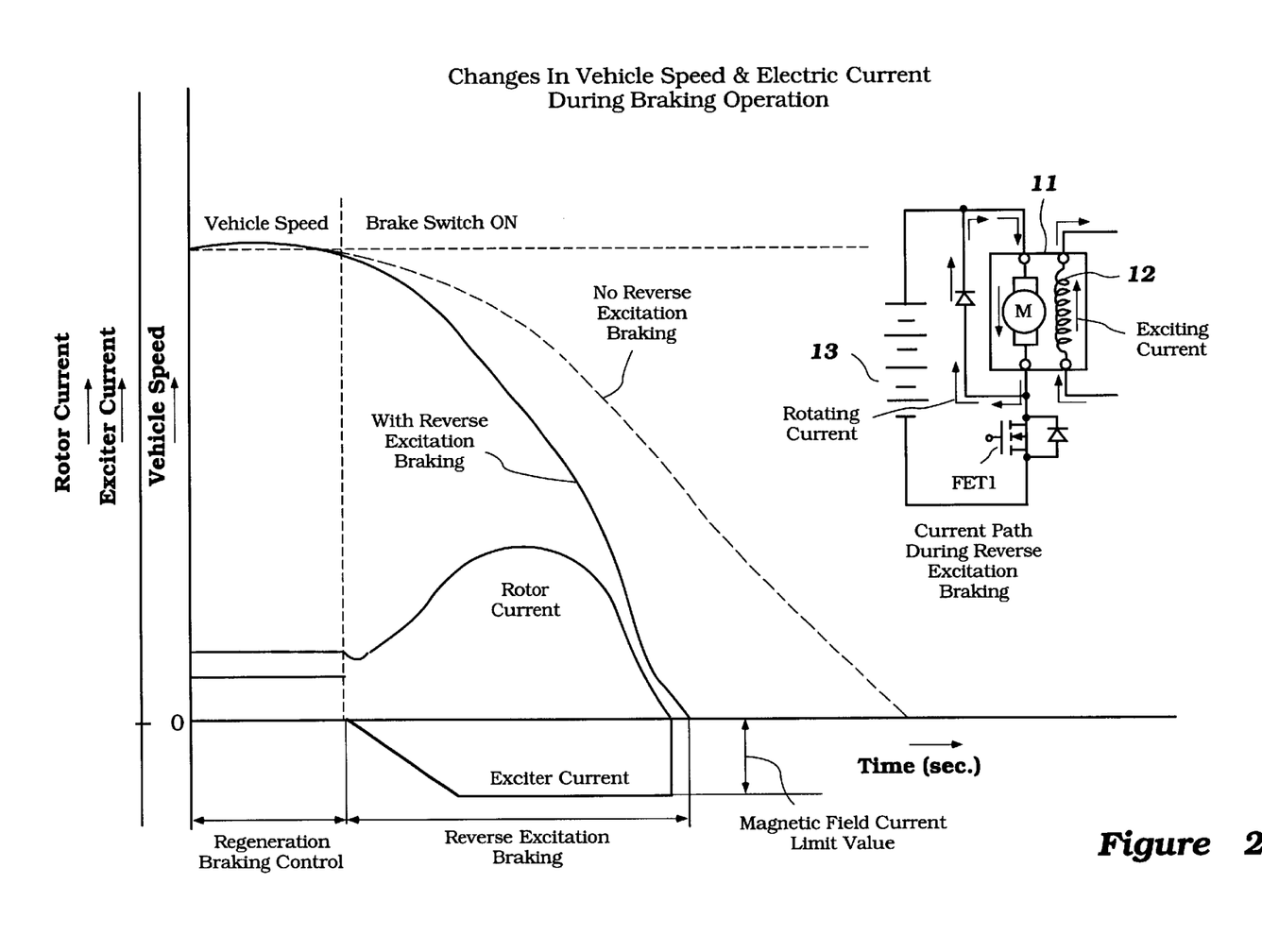
FIG. 2 is a graphical view showing the reverse excitation and regenerative braking and shows curves indicating vehicle speed, type of brake operation, rotor current, and exciter current in connection with this embodiment.
Figure 3:
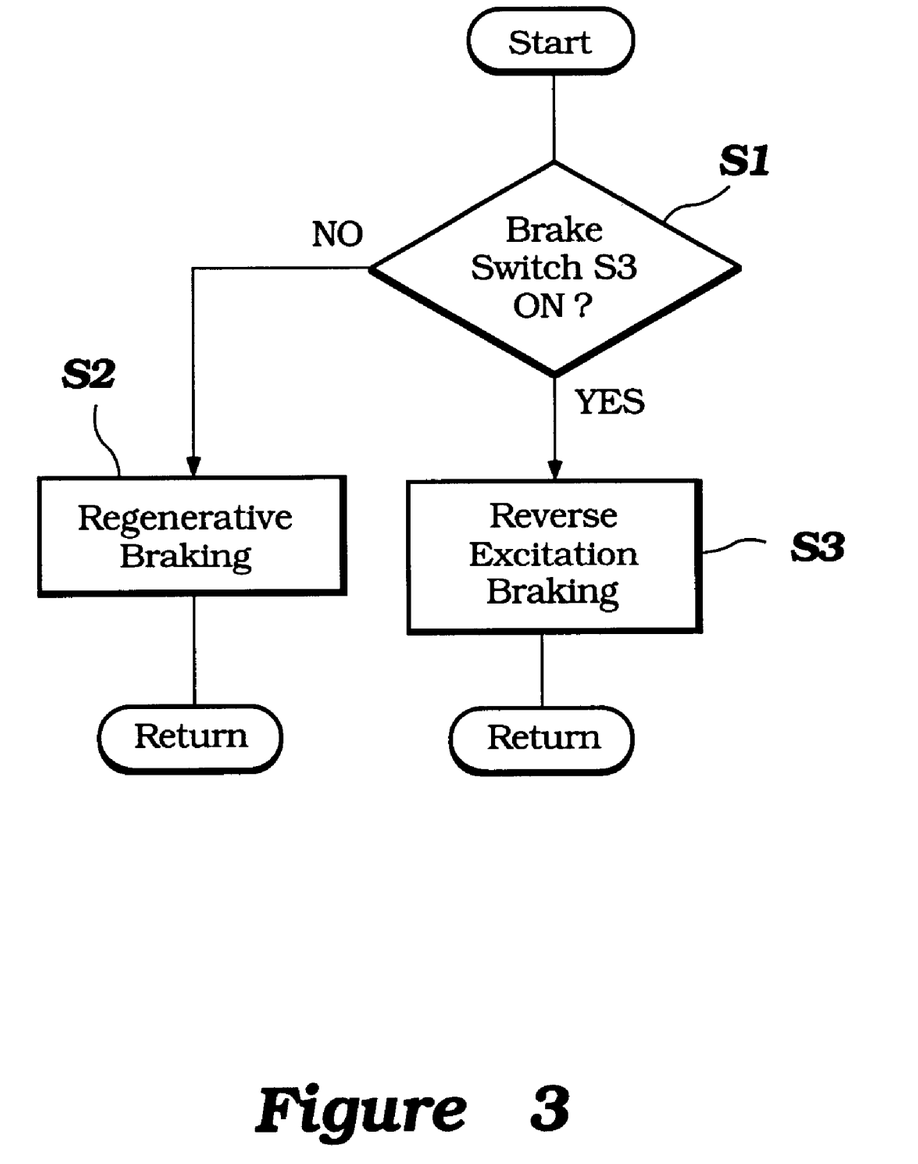
FIG. 3 is a graphical view showing a portion of the control routine for this embodiment.

This control methodology will now be described by reference to first FIG. 2 and later associated with it FIGS. 3 and 4 which show the braking circuit. Referring first to FIG. 2, this shows the vehicle speed, rotor or armature current and exciter current through the shunt motor 11 and exciter winding 12, respectively.

As may be seen in the left-hand side of the vertical broken line that indicates the demarcation point between regenerative braking control and reverse excitation braking control, which occurs when the operator depresses the brake pedal. The condition illustrated is when braking after traveling at a constant speed. As such, the exciter and rotor currents are constant and the vehicle speed will be constant until the brake pedal is operated.

During this phase, if the accelerator pedal is released, there will be regenerative braking. However, as shown by the broken line view of FIG. 1, the vehicle speed will decay relatively slowly and, therefore, the amount of braking with conventional vehicles employing regenerative braking is frequently supplemented by a more conventional frictional type brake.

However, when the brake switch S3 is turned on in this embodiment, then an exciter current is applied in a negative direction with the amount limited by the limit value of the protective circuit 36 so that there will be generated a reverse strong current flow through the rotor which will provide a rapid decrease in vehicle speed. Thus, when the brake switch S3 is operated with this embodiment, the system switches from regenerative braking to reverse excitation braking by the shift controller 28 of the ECU 23 switching from the one braking control 26 to the other braking control 27.

The logic by which this operates will now be described by reference to FIGS. 3 and 4. FIG. 3 shows the basic control routine for determining braking. The program starts and moves to the step S1 to determine if the brake switch S3 is on. If it is not, the program moves to the step S2 so as to provide regenerative braking when required and then returns.

If, however, at the step S1 it is determined that the brake switch S3 is on, then the program moves to the step S3 so as to initiate reverse excitation braking in the manner which will be described by reference to FIG. 4. The program then returns.

Figure 4:
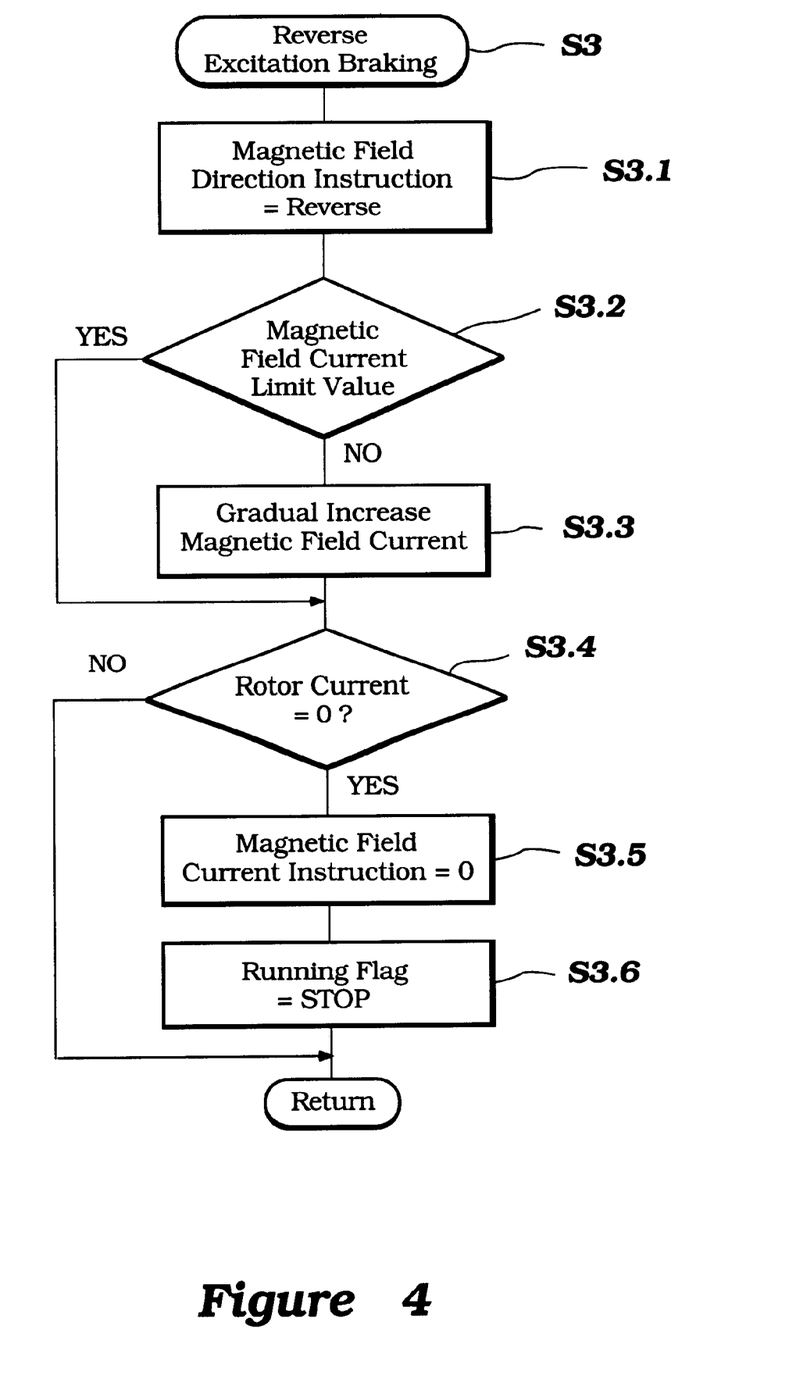
FIG. 4 is a graphical view showing the control routine during the reverse excitation braking.

Referring now to FIG. 4, when operating in the reverse excitation braking mode, the program moves to the step S3.1 wherein the magnetic field direction instruction to reverse is set. This is done by the section 35 of the motor controller 16 previously referred to and occurs at the time when the brake switch S3 is applied, as aforenoted.

The program then moves to the step S3.2 so as to read the exciter current flow from the CT2 and to determine if it has reached the maximum limited value set by the protection circuit 36. It should be noted and as shown by the lower portion of FIG. 2, that the exciter current is not immediately placed at its maximum value, but is gradually built up so as to avoid abrupt braking condition. Therefore, if at the step S3.2 maximum current is not experienced, the program moves to the step S3.3 to incrementally increase the exciter current.

If the maximum value is found at the step S3.2, the program jumps ahead.

From either the step S3.2, if the value is "yes," or from the step S3.3 after completion of the increase, the program moves to the step S3.4 to determine if the rotor current has fallen to zero. This current is sensed so as to determine if the rotation of the motor has, in fact, stopped. If the rotor current as sensed by the CT1 is not zero, the program skips ahead and returns.

If, however, the rotor current has fallen to zero, then the program moves to the step S3.5 so as to terminate the exciter current supplied to the exciter coil 12. The program then moves to the step S3.6 to set the run condition flag to indicate that the vehicle has stopped.

In the embodiment of the invention thus far described, the brake operation has been such that, when the brake switch is switched on, the device operates so as to apply a regenerative braking in gradually increasing amounts by increasing the exciter current up to a maximum value. This is then held until the vehicle comes to a halt or the brake pedal is released.

Figure 5:
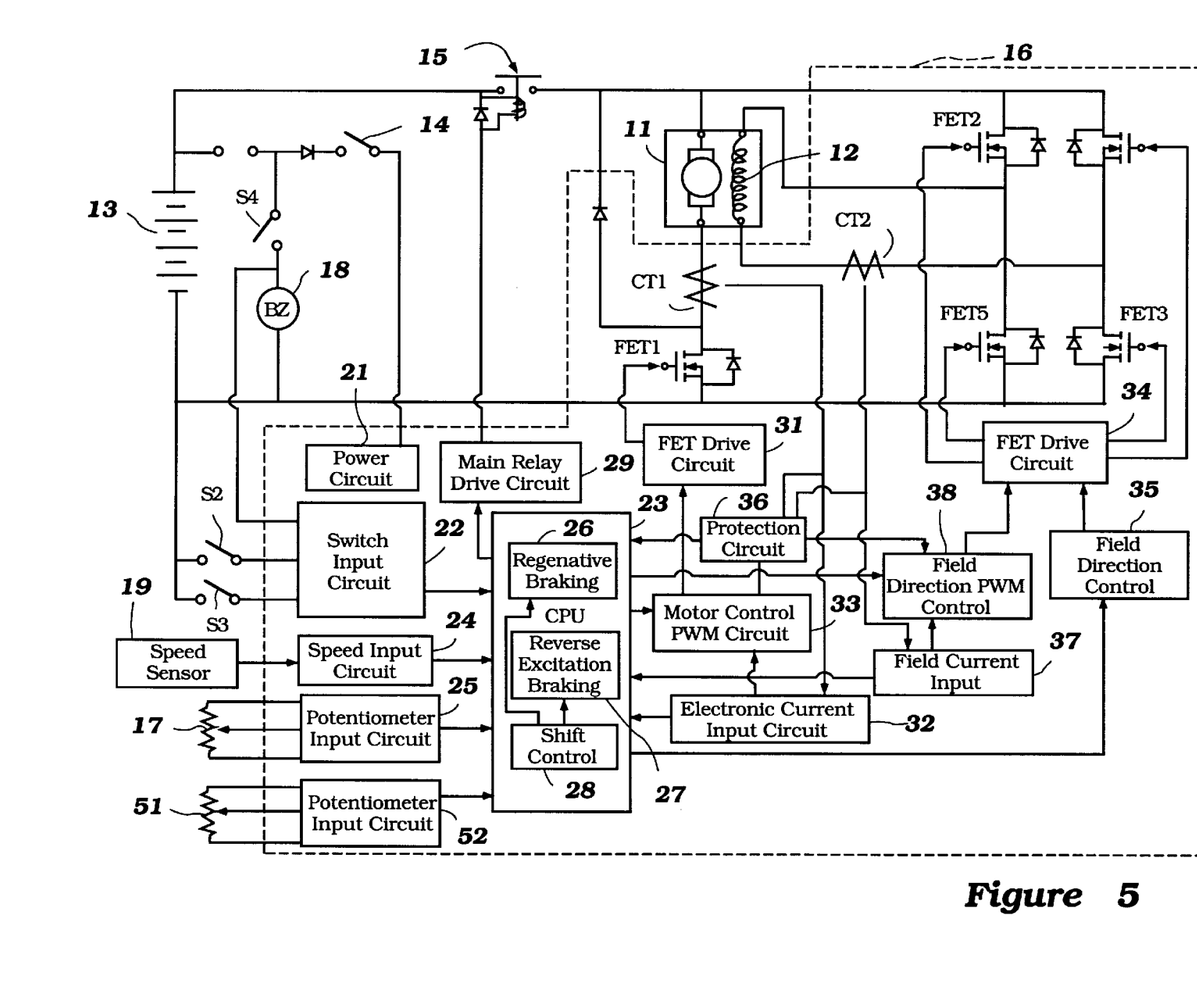
FIG. 5 is a partially schematic electrical diagram, in part similar to FIG. 1 and shows a second embodiment of the invention.
Figure 6:
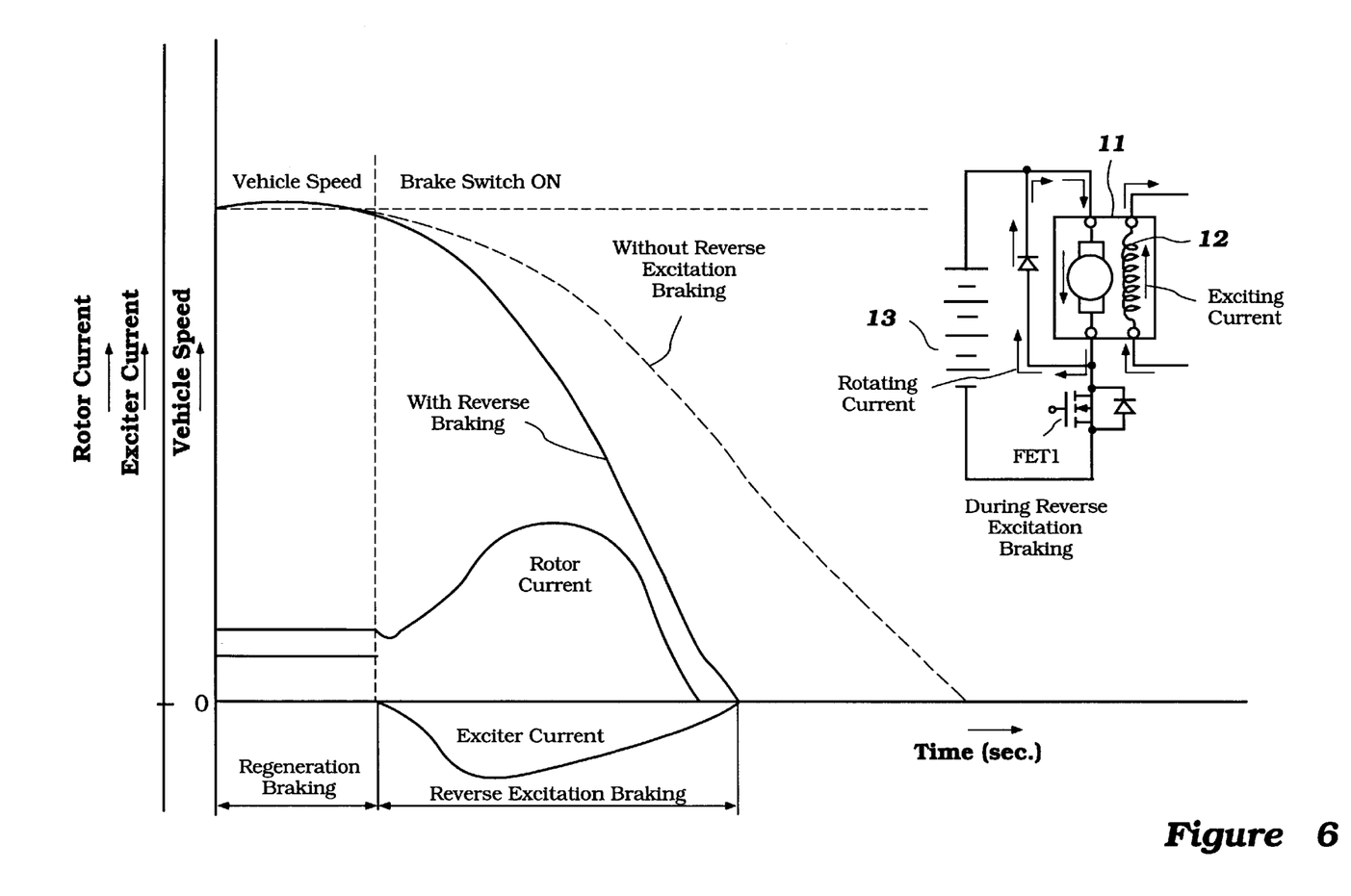
FIG. 6 is a graphical view, in part similar to FIG. 2, and shows the operation modes and curves for this embodiment.
Figure 7:
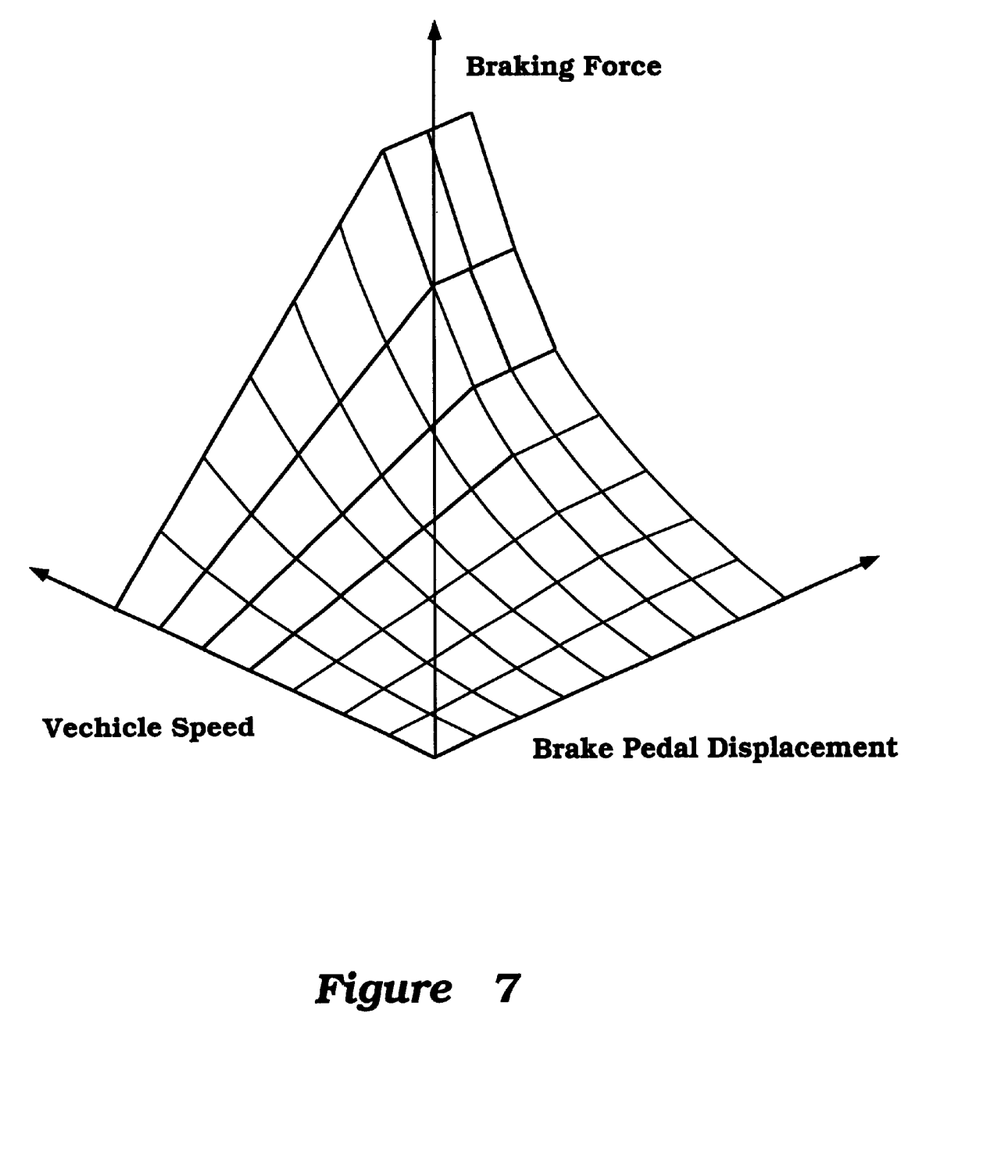
FIG. 7 is a graphical view showing the three-dimensional map employed to utilize brake pedal actuation and vehicle speed to determine the brake assist amount for regenerative braking.

Obviously, it may be desirable to provide more accurate and finer braking control for the operator. FIGS. 5–7 show another embodiment of the invention wherein this is achieved. In this embodiment, the basic control circuit is the same as that previously described and, therefore, this description will not be repeated.

This device differs from that previously described in that there is associated with the brake switch S3 a further potentiometer, indicated by the reference numeral 51 which, like the accelerator potentiometer 17, outputs its signal indicating the degree of braking called for by the operator to a potentiometer input circuit 52. This outputs its signal to the CPU 23 so as to provide a control signal.

In this embodiment, it will be seen that the exciter current will gradually build up and will then decrease, not because of any reason other than the operator will release the pressure on the brake pedal as the speed of the vehicle decreases. Thus, it is possible to provide a much more modulated braking effect. Of course, this system is somewhat more expensive than the previously described embodiment.

As may be seen from FIG. 7, the CPU regulates the braking force based on a combination of brake pedal depression and vehicle speed, in accordance with a suitable mapped relationship.

Thus, from the foregoing description, it should be readily apparent that the described embodiments of the invention provide extremely good braking operation for an electric motor-driven vehicle without necessitating use of a frictional brake or with substantially reducing the nature of the frictional brake that must be employed. Of course, the foregoing description is that of preferred embodiments of the invention and various changes and modifications may be made without departing from the spirit and scope of the invention, as defined by the appended claims.

What is claimed is:

1. An electric motor control system for an electric motor driven vehicle comprised of a shunt type electric motor, a battery for supplying electric power to said shunt type motor, an accelerator control for operation by an operator, a control circuit for receiving the input from said accelerator control and actuating the exciter winding of said shunt-type motor for driving said motor, a regenerative braking means for generating electric power by using said shunt motor as a generator for providing regenerative braking for said vehicle through charging of said battery, a reverse exciting winding braking means for applying reverse excitation to said exciter winding, and means responsive to an operator input for shifting the braking from regenerative braking to reverse excitation braking.

2. An electric motor control system as set forth in claim 1, wherein the shift from regenerative braking to reverse exciting winding braking is controlled by an operator actuated brake operator.

3. An electric motor control system as set forth in claim 2, wherein there is provided a brake control actuator position sensor and the amount of reverse excitation winding braking is varied in response to the position of said brake control.

4. An electric motor control system as set forth in claim 3, further including means for sensing the speed of the vehicle and controlling the amount of reverse excitation braking in relation to the actual speed of the vehicle.

* * * * *